(12) United States Patent
Deng et al.

(10) Patent No.: US 7,982,987 B2
(45) Date of Patent: Jul. 19, 2011

(54) METHODS AND APPARATUS TO DETECT SURFACE CHARACTERISTICS ON MAGNETIC READ/WRITE HEADS

(75) Inventors: Youping Deng, Saratoga, CA (US); Randall G. Simmons, San Jose, CA (US); Wing T. Tang, Palo Alto, CA (US); Huiping Yang, JiangXi (CN)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/329,719

(22) Filed: Dec. 8, 2008

(65) Prior Publication Data

US 2010/0142080 A1 Jun. 10, 2010

(51) Int. Cl.
*G11B 27/36* (2006.01)
*G11B 21/02* (2006.01)
*G11B 5/02* (2006.01)
(52) U.S. Cl. ................. 360/31; 360/25; 360/75
(58) Field of Classification Search .................. None
See application file for complete search history.

(56) References Cited

U.S. PATENT DOCUMENTS

| | | | |
|---|---|---|---|
| 6,853,508 B2 | 2/2005 | Smith et al. | |
| 6,980,383 B2 | 12/2005 | Brunnett et al. | |
| 7,286,315 B2 | 10/2007 | Ryu | |
| 7,375,912 B2 | 5/2008 | Brannon et al. | |
| 7,436,619 B2 * | 10/2008 | Takahashi | 360/75 |
| 7,589,928 B2 * | 9/2009 | Roy et al. | 360/75 |
| 2003/0202273 A1 | 10/2003 | Smith | |
| 2003/0210488 A1 | 11/2003 | Ottesen et al. | |
| 2008/0043363 A1 | 2/2008 | Yamashita et al. | |

* cited by examiner

*Primary Examiner* — Andrew L Sniezek
(74) *Attorney, Agent, or Firm* — Patterson & Sheridan, LLP

(57) ABSTRACT

A method and apparatus for detecting predetermined surface characteristics in head gimbal assemblies to improve hard disk drive reliability. The predetermined surface characteristics include head slider protrusions such as scratches or contamination that can cause damage to the head or disk in hard drives. By detecting these protrusions, those drives with an increased chance of failure can be removed from a test group, thereby increasing the quality and reliability of the remaining disk drives. The invention provides a method of detecting these protrusions that is a more practical option than using a scanning electron microscope (SEM) to inspect each head slider.

17 Claims, 5 Drawing Sheets

METHODS AND APPARATUS TO DETECT SURFACE CHARACTERISTICS ON MAGNETIC READ/WRITE HEADS

BACKGROUND OF THE INVENTION

1. Field of the Invention

The present invention generally relates to hard disk drives (HDDs), and more particularly to methods and apparatus for electrically detecting predetermined surface characteristics on magnetic read/write heads, such as head slider surface imperfections and contamination.

2. Description of the Related Art

Disk drives using magnetic recording of digital information store most of the information in contemporary computer systems. A disk drive has at least one rotating disk with discrete concentric tracks of data. Each disk drive also has at least one recording head typically having a separate write element and read element for writing and reading the data on the tracks. The recording head is constructed on a head slider and the head slider is attached to a suspension. The combination of the recording head, head slider, and suspension is called a head gimbal assembly (HGA). An actuator positions the recording head over the specific track of interest. The actuator first rotates to seek the track of interest and after positioning the recording head over the track, maintains the recording head in close registration to that track. The disk in a disk drive has a substrate and a magnetic layer on the substrate for magnetic recording. The head slider carrying the recording head has a disk facing surface upon which an air bearing surface (ABS) is constructed. The ABS allows the slider to float on a cushion of air and to be positioned close to the disk surface. The head slider includes a fly-height control for adjusting the distance between the head slider and the magnetic disk. As the areal density of HDDs increases and the flying height of the head slider above the disk surface decreases, any head slider protrusion or contamination (particularly at the lowest flying portions of the head), may cause contact between the head slider and the magnetic disk. Contact between the recording head ABS and the disk can cause damage to the recording head and can also lead to wear failure at the interface between the recording head and the disk. If those drives most likely to fail can be screened out, the reliability and quality of the remaining drives can be increased. The current method of inspecting head slider surfaces using a scanning electron microscope (SEM), is not practical for testing each and every HGA, and other optical inspection techniques may miss microscopic protrusions or contamination that are still large enough to cause failures in the HDDs. It has been found, in fact, that head sliders with gross contamination that can be detected by SEM, can often not be detected by even 1000× optical screening.

SUMMARY OF THE INVENTION

Considering the above-mentioned situation, embodiments of the invention provide electrically-based methods and apparatus to detect the presence of predetermined surface characteristics on magnetic read/write heads.

According to a first embodiment of the invention, there is provided a method of detecting predetermined surface characteristics in a hard disk drive, the hard disk drive having a magnetic disk and a head slider with read and write elements and a fly-height control for adjusting a clearance between the head slider and the magnetic disk, the method including applying a control signal to the fly-height control to adjust the clearance between the head slider and the magnetic disk, measuring an output of the read element, determining if a touch-down between the head slider and the magnetic disk occurs based on the measured output of the read element, measuring the control signal to the fly-height control, and determining if a predetermined surface characteristic exists in the hard disk drive based on the measured control signal to the fly-height control.

According to a second embodiment of the invention, there is provided an apparatus for detecting predetermined surface characteristics in a hard disk drive, the hard disk drive having a magnetic disk and a head slider with read and write elements and a fly-height control for adjusting a clearance between the head slider and the magnetic disk, the apparatus including a fly-height control circuit for applying a control signal to the fly-height control to adjust the clearance between the head slider and the magnetic disk, a read element sensing circuit for measuring an output of the read element, a touch-down detection circuit for providing a touch-down signal when a touch-down between the head slider and the magnetic disk occurs based on the measured output of the read element, a controller circuit for measuring the control signal applied to the fly-height control, receiving the touch-down signal from the touch-down detection circuit, and determining and providing an indication as to whether a predetermined surface characteristic exists in the hard disk drive based on the measured control signal applied to the fly-height control.

According to a third embodiment of the invention, there is provided a method of detecting predetermined surface characteristics in a hard disk drive, the hard disk drive having a magnetic disk and a head slider with read and write elements and a fly-height control for adjusting a clearance between the head slider and the magnetic disk, the method including applying a control signal to the fly-height control to adjust the clearance between the head slider and the recording disk, measuring an output of the read element, determining if a touch-down between the head slider and the recording disk occurs based on the measured output of the read element, measuring the control signal to the fly-height control when a detected touch-down between the head slider and the magnetic disk occurs, determining if a predetermined surface characteristic exists in the hard disk drive based on the measured control signal to the fly-height control at the time of the detected touch-down between the head slider and the magnetic disk.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
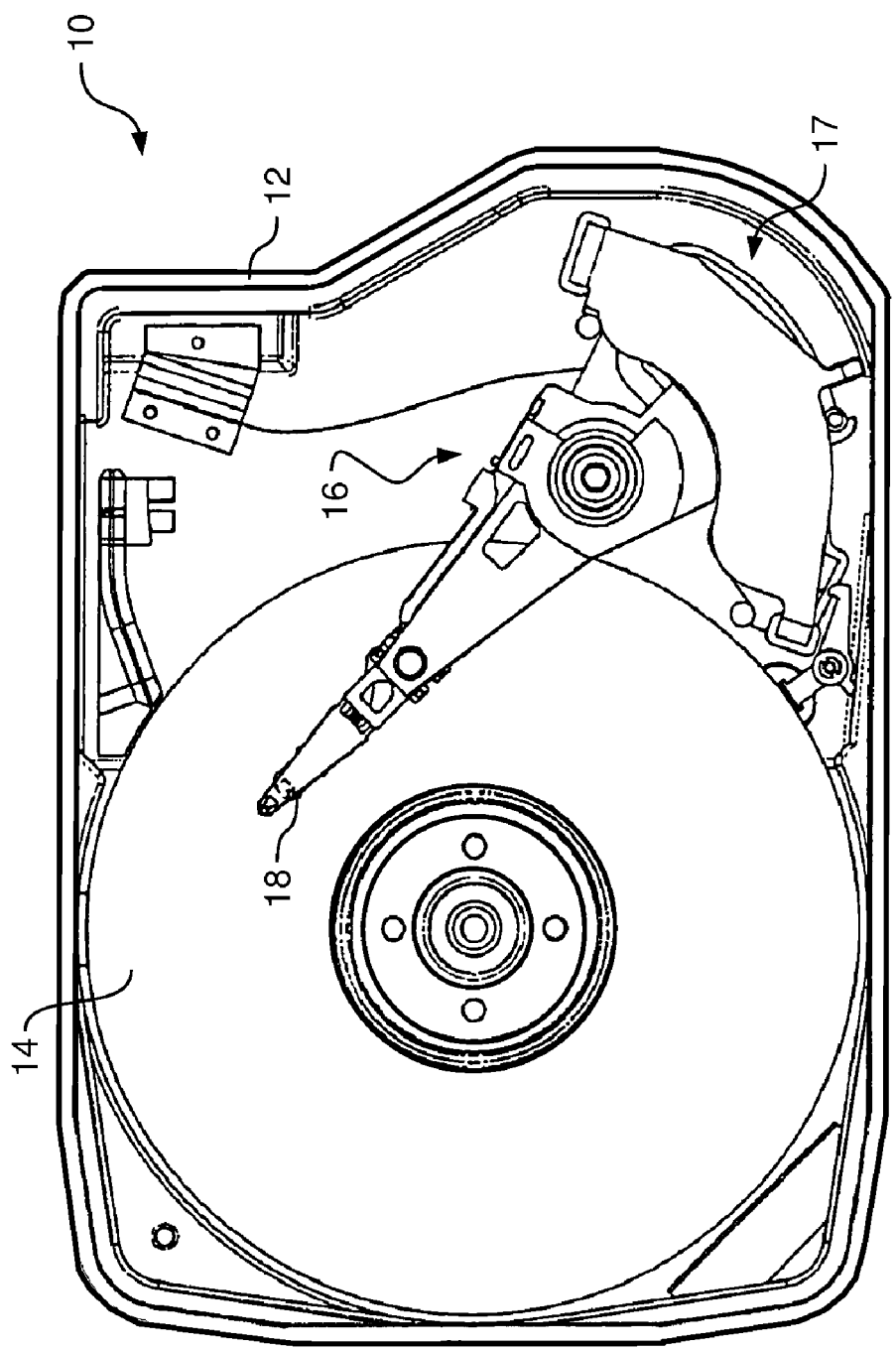
FIG. 1 shows an exemplary disk drive having a magnetic disk, magnetic read/write head and a head slider with fly-height control, according to one embodiment of the invention.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Embodiments of the present invention generally provide methods and apparatus for detecting predetermined surface characteristics in head gimbal assemblies (HGAs) of hard disk drives (HDDs). More specifically the methods and apparatus of the present invention provide a method of detecting surface defects in head sliders such as scratches and contamination, to thereby increase the overall reliability and quality of HDDs by screening out problematic HGAs that have a higher potential for failure. By removing these potential failures prior to the final assembly of the HDDs, the remaining HDDs have higher reliability and quality. In one embodiment, an HGA is provided with a thermal fly-height control (TFC) heating element to adjust the distance between the head slider and the magnetic disk in an HDD. This heating element is embedded in the read/write head and heats up the head to cause expansion and move the read/write elements closer to the magnetic disk, and eventually can cause contact between the head slider and the magnetic disc. This contact is herein called a "touch-down" condition. Head sliders with imperfections that cause protrusions (such as scratches, or contamination) will have surface features that are closer to the magnetic disk than head sliders that are free from protrusions. The amount of power supplied to the TFC is proportional to the movement of the slider toward the magnetic disk. Therefore touch-down of head sliders with protrusions will generally occur with less power supplied to the TFC than head sliders without protrusions.

Embodiments of the present invention use a dynamic electrical tester (DET) to measure the electrical power supplied to the TFC that is sufficient to cause a touch-down condition. Because the power required to cause touch-down in head sliders with protrusions is less than head sliders without protrusions, head sliders with potential problems can be identified and removed from the test group, resulting in higher reliability and quality of the remaining HDDs. There are several techniques that may be used to detect the when touch-down occurs between the head slider and the magnetic disk. In a first embodiment, the output from the read element is monitored. As the applied TFC power is increased, the head approaches the magnetic disc causing a corresponding increase in signal amplitude. Once the head touches down on the disk, the signal amplitude no longer increases. In some cases, the head signal may decrease after touch-down because the magnetic disk drags the head off the data track. In either case, the change in signal amplitude is detectable and can be correlated to touchdown. By monitoring this signal, touch-down between the head and disk can be detected. In another embodiment, the resonance frequency of the head slider can be detected. When the head touches down on the disk, the head slider attached on a suspension becomes excited and resonates at its natural frequency or frequencies. By detecting the head slider resonance at these specific frequency or frequencies, the touch-down can be detected. In yet another embodiment, acoustic emission (AE) from the head and disk is sensed. When the head touches down on the disk, acoustic energy is generated and can be detected by an AE sensor. The AE sensor can be attached to the head slider or head suspension (actuator) for example. Persons of skill in the art will recognize other embodiments. In any of these embodiments, head slider surface imperfections will cause an early indication of a touch-down as opposed to head sliders without imperfections. Once the touch-down is detected, comparing the power to the TFC required to cause touch-down, to a predetermined minimum value, problematic HGAs can be identified. The methods and apparatus of the invention can be used in dynamic testing of an HGA, a head stack assembly (HSA) or an HDD and can minimize failures in operational reliability tests (ORTs), reliability verification tests (RVTs) and other product qualification tests.

FIG. 1 shows one embodiment of a magnetic hard disc drive 10 that includes a housing 12 within which a magnetic disc 14 is fixed to a spindle motor (SPM) by a clamp. The SPM drives the magnetic disk 14 to spin at a certain speed. A head slider 18 accesses a recording area of the magnetic disk 14. The head slider 18 has a head element section and a head slider to which the head section is fixed. In particular, the head slider 18 is provided with a fly-height control which may be a thermal fly-height control (TFC), such as a heater to thermally protrude the head element section so as to adjust its clearance (flying height) above the magnetic disk 14. The configuration of the head slider 18 will be more fully described later. The actuator 16 carries the head slider 18. In FIG. 1, the actuator 16 is pivotally held by a pivot shaft, and is pivoted around the pivot shaft by the drive force of a voice coil motor (VCM) 17 as a drive mechanism. The actuator 16 is pivoted in a radial direction of the magnetic disk 14 to move the head slider 18 to a desired position. Due to the viscosity of air between the spinning magnetic disk 14 and the head slider's air bearing surface (ABS) facing the magnetic disk 14, a pressure acts on the head slider 18. The head slider 18 flies low above the magnetic disk 14 as a result of this pressure balancing between the air and the force applied by the actuator 16 toward the magnetic disk 14. If the ABS of head slider 18 includes surface imperfections and/or contamination that touch the surface of the magnetic disk 14, failure of the disk drive 10 can result. Examples of ABS imperfections that have protrusions include: fences and ledges created in the head slider photolithographic and vacuum deposition processes; scratches; and non-removable surface contaminations. One failure of the disk drive that can be contributed to these surface imperfections is a point protrusion on the head slider ABS dragging on the disk surface, generating a large amount of frictional heating. In addition to causing magnetic erasure on the disk 14, the high temperature contact point can also become a catalytic site for tribochemistry to occur, resulting in smears that contain siloxane. While this failure mechanism is particularly severe in high speed drives, it has also been observed in lower speed drives. The traditional approach is to optically inspect the head slider surface for imperfections and to screen out the head sliders with imperfections or contamination. Often, however, fine scratches and nanometer-scale contamination escape optical inspection and ultimately cause drive failure. While the use of a scanning electron microscope (SEM) may increase the chance of detecting the imperfections, it is not practical to use an SEM to inspect each and every head slider.

Figure 2:
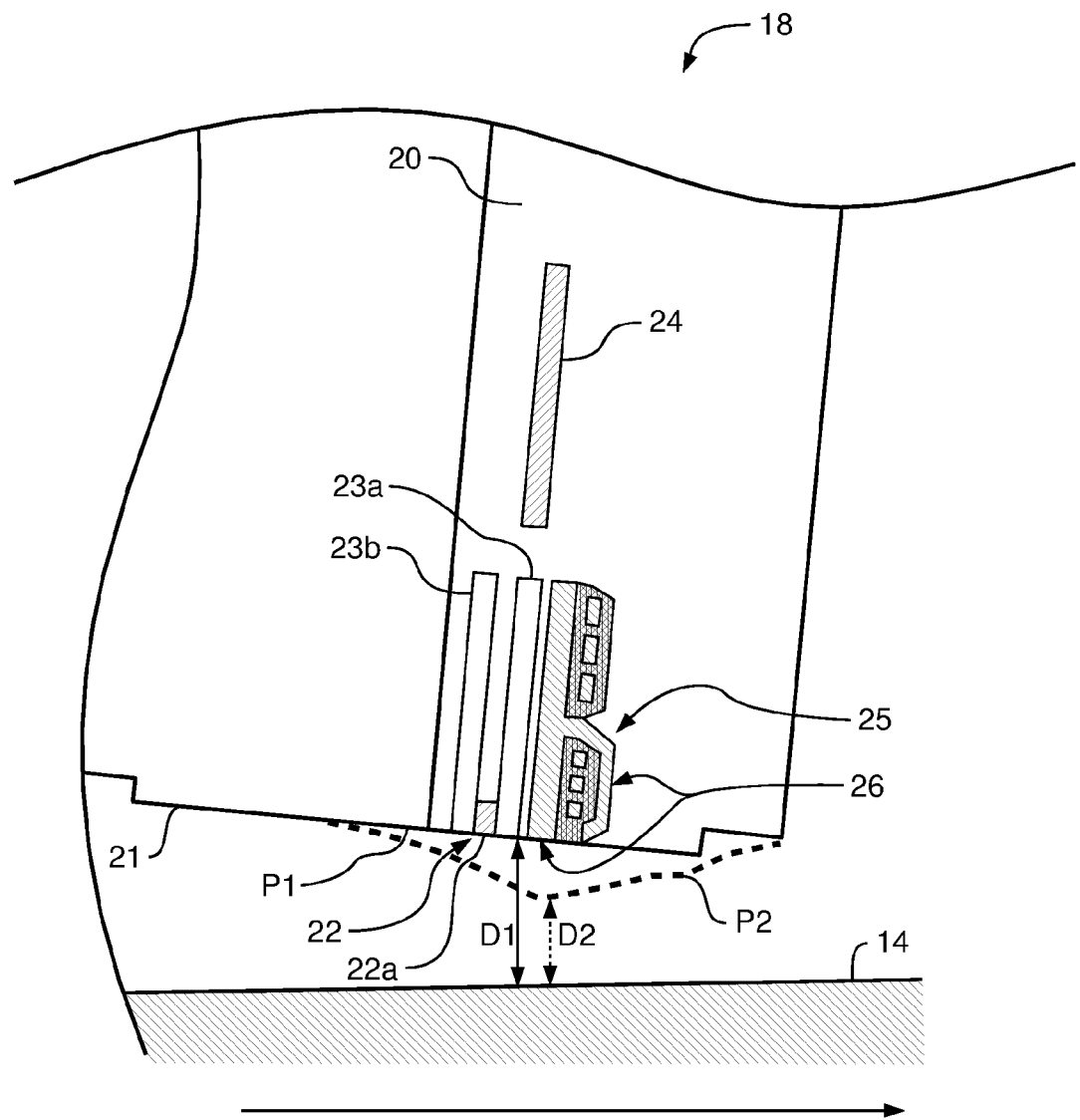
FIG. 2 is a side view of the read/write head, head slider and magnetic disk of the disk drive of FIG. 1, according to one embodiment of the invention.

FIG. 2 shows the relationship between the head slider 18 and the magnetic disk 14. In FIG. 2, the magnetic disk 14 rotates from left to right. The head slider 18 includes the read/write head 20 and supports the read/write head 20 above the disk 14 on the ABS 21. It is contemplated that the methods and apparatus of the present embodiment may be used with both horizontal and perpendicular magnetic recording HDDs. The read/write head 20 reads and writes magnetic data from and to the magnetic disk 14. The read/write head 20 has a read element 22 and, on its trailing side, a write element 25. The write element 25 is an inductive device which records magnetic data on the magnetic disk 14 by applying a current through a write coil to generate a magnetic field between magnetic poles 26. The read element 22 is a magnetoresistive device having a magnetoresistive element 22a which shows magnetic anisotropy. Magnetic data recorded on the magnetic disk 14 is retrieved according to the resistance of the magnetoresistive element 22a which changes depending on the magnetic field from the magnetic disk 14. The magnetoresistive element 22a is sandwiched between magnetic shields 23a and 23b. A fly-height control 24 is disposed near the write element 25 and read element 22. The fly-height control may be a thermal fly-height control (TFC) and may include a heater. While not intended to be limiting, for purposes of description, the fly-height control 24 will be described herein as a heater 24. In one embodiment, the heater 24 is a thin film resistor formed by using thin film processes. For example, the thin film resistor of the heater 24 can be obtained by forming a thin zigzag Permalloy line in a portion of the head and filling the area with alumina.

When power is supplied to the heater 24, heat from the heater 24 deforms/protrudes the head elements 22 and 25 toward the magnetic disk 14. When not heated, the ABS 21 of the head slider 18 has a profile as indicated by P1. In this case, the distance or clearance between the ABS 21 and the magnetic disk 14 is indicated by D1. When heated by the heater 24, the ABS protrudes as indicated by broken line P2. The ABS 21 comes closer to the magnetic disk 14, and the resulting clearance D2 is smaller than clearance D1. Although the heater 24 is located further from the ABS 21 and separated from the head elements 22 and 25 so as not to thermally damage the head elements 22 and 25, thermal expansion of the material surrounding the heater 24 propagates to the ABS 21. Consequently, the material surrounding the ABS 21 expands so as to protrude the ABS 21 toward the magnetic disk 14. Note that FIG. 2 is a schematic diagram and not to scale. For example, the protrusion profile P2 may illustrate a nanometer-order (several nanometers) protrusion according to one embodiment of the invention.

The size of the protrusion P2 is proportional to the power supplied to the heater 24 and the distance D2 is inversely proportional to the power supplied to the heater 24. Thus, by incrementally increasing the power to heater 24, the distance D2 can be decreased until actual contact between the ABS 21 (and/or any surface irregularities located on the ABS 21) and the magnetic disk 14 occurs, (D2=0). When this contact occurs, the output from the magnetoresistive read element 22a, may reach a maximum value. In one embodiment, by measuring the output of the magnetoresistive element 22a, this signal change can be identified and used as an indication that touch-down between the ABS 21 (and/or any surface irregularities thereon) and the disk 14 has occurred. When contamination or other surface imperfections exists on ABS 21 of the head slider 18, D1 and D2 are both reduced as opposed to when such imperfections do not exist on the ABS 21 of the head slider 18. The amount of power supplied to the heater 24 that results in a touch-down condition is, therefore, relatively less when undesired surface conditions exist on the head slider. When testing an HGA, comparing the power supplied to the heater to a predetermined minimum power value, when a touch-down condition occurs, can indicate a potential undesired surface condition and the HGA can be removed from the test group. Doing so can minimize the overall failures that can occur later in the group of HDDs.

Figure 3:
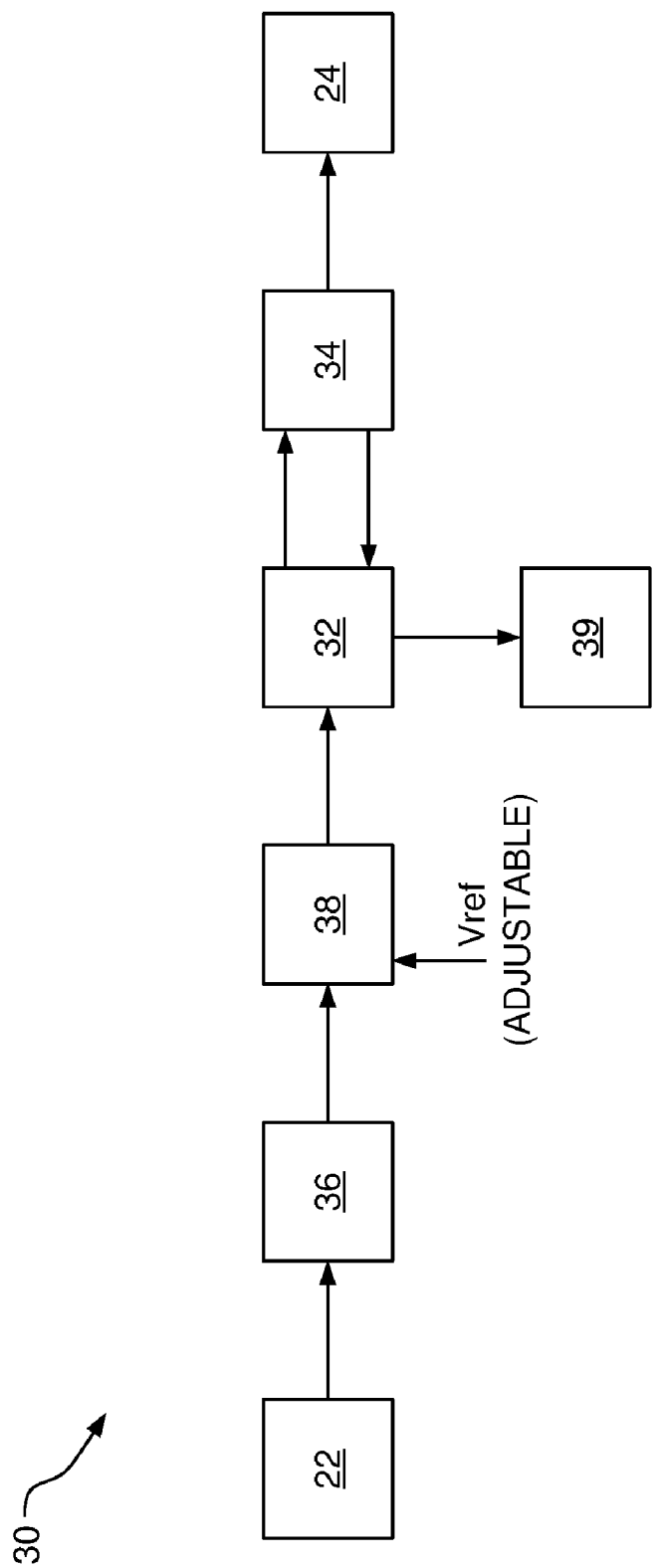
FIG. 3 is a circuit diagram of an embodiment of a testing apparatus for detecting predetermined surface characteristics in a hard disk drive, according to one embodiment of the invention.

In FIG. 3, one embodiment of control circuitry 30 for performing the methods of the invention is shown as a block diagram. A controller 32 sends and receives signals from the other circuits and in one embodiment is a microprocessor. The controller 32 provides a signal to a fly-height control circuit 34 such that fly-height control circuit 34 provides the appropriate control signal to the fly-height control 24 to adjust the fly-height distance, in accordance with the methods described below with reference to FIG. 4. When the fly-height control is a thermal fly-height control (TFC) such as the heater 24 described above, the control signal is power provided to the heater 24. The fly-height control circuit 34 also provides an appropriate feedback signal (such as a voltage level) to the controller 32 indicative of the level of the control signal to the fly-height control 24.

A read element sensing circuit 36 receives the output signal from the read element 22 and provides a signal proportional to the read element output to a touchdown detection circuit 38. Read element sensing circuit 36 may amplify or otherwise convert the read element output signal such that it is usable by the touchdown detection circuit 38. The touchdown detection circuit 38 monitors the output from the read element sensing circuit 36 and provides a signal to the controller 32 to indicate when a maximum value has occurred in the output signal from the read element 22, thereby indicating that a touch-down condition exists between the head slider 18 and the magnetic disk 14. In one embodiment, the touchdown detection circuit 38 may compare the output from the read element sensing circuit 36 to a reference signal level ($V_{ref}$) indicative of a maximum value of the signal from the read element. In one embodiment, the reference signal may be adjustable, so that, for example the reference level can be varied to approximate the maximum level from read elements of different types or characteristics. In another embodiment, the touchdown detection circuit 38 may continuously monitor the output from the read element sensing circuit 36 and detect when a maximum value of the signal has been reached, (when the signal no longer increases). Comparator and peak detector circuits are well known and a detailed explanation is not deemed necessary in the context of the present application. Other techniques for sensing the touch-down can be used as previously described. Once the touch-down has been detected, the touchdown detection circuit 38, provides a signal indicative of the same to controller 32. For example, the touchdown detection circuit 38 may output a digital signal in which a logical "0" can be used to indicate a "no touch-down" condition, and a logical "1" can be used to indicate a "touch-down" condition.

Once an HGA has either passed or failed the evaluation performed by apparatus 30, controller 32 outputs a signal to indicator 39, which in turn provides an indication of the results of the evaluation. The indication may be as simple as a green light to indicate the HDD has passed the evaluation, or a red light to indicate the HDD has failed the evaluation. Alternatively, or in addition to this simple indication, a numerical indication of the amount of power provided to the TFC to achieve touch-down may be displayed. In this manner, an operator may make the final decision to pass or fail an HDD based on the numerical indication. A more detailed explanation of the operation of apparatus 30 is provided below with respect to the methods of the present invention.

Figure 4:
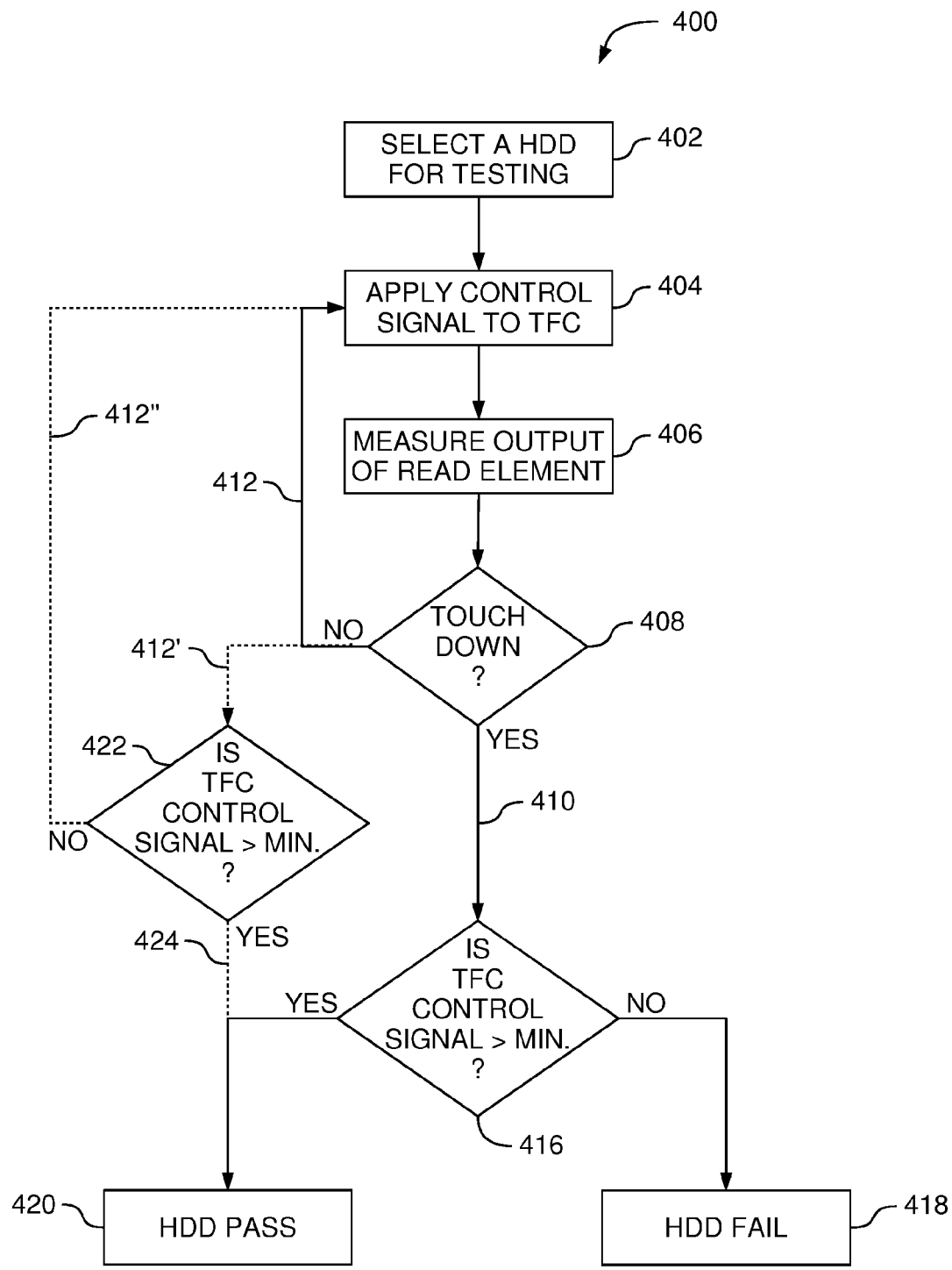
FIG. 4 is a flow chart of embodiments of a method for detecting predetermined surface characteristics in a hard disk drive, according to one embodiment of the invention.

FIG. 4 is a flow chart illustrating the steps in embodiments 400 of the method of detecting predetermined surface characteristics in a hard disk drive of the present invention. Initially, in step 402 an HDD is selected for testing and is electrically connected to the control circuitry 30 of FIG. 3. It should be understood that the control circuitry 30, is just one particular circuit for carrying out the methods of the present invention and should not be considered limiting. Once connected, the fly-height control circuit 34 provides an initial signal to the TFC 24 at block 404. The read element sensing circuit 36 measures the output of the read element 22 at block 406 and provides this measurement to the touch-down detection circuit 38. The touch-down detection circuit 38 determines if a touch-down has occurred at block 408, as described above. If a touch-down has not occurred, the controller 32 sends a signal to the fly-height control circuit 34 to reduce the fly-height, shown as line 412, returning to block 404. When a resistor-based TFC is used, increasing power to the resistor decreases the fly-height of the head slider over the magnetic disk. Again, the read element sensing circuit 36 measures the output of the read element 22 at block 406 and provides this measurement to the touch-down detection circuit 38, and the touch-down detection circuit 38 determines if a touch-down has occurred at block 408. This process continues, with the fly-height being reduced until touch-down is detected, and the method proceeds to block 416 as shown by line 410. At block 416, the controller compares the control signal to the TFC, with a predetermined minimum value. If the control signal to the TFC is equal to or below the predetermined minimum value, it is determined that there is an undesired surface characteristic and the method proceeds to block 418 where an indication is provided to indicator 39 that the HDD has failed. If the control signal to the TFC is above the predetermined minimum value, it is determined that an undesired surface characteristic is not present and the method proceeds to block 420 where an indication is provided to indicator 39 that the HDD has passed. The HDD is then disconnected from the control circuitry 30 and another HDD is connected for testing.

To decrease the time required to identify drives that will pass the testing process, in an alternative embodiment, the method 400 proceeds to block 422 from block 408 of FIG. 4. as shown by line 412', when a touch-down is not detected. When touch-down is not detected at block 408, the controller 32 compares the control signal to the TFC, with the predetermined minimum value. If the control signal to the TFC is equal to or below the predetermined minimum value, the method proceeds to block 404 as shown by line 412". If the control signal to the TFC, is above the predetermined minimum value, (even though touch-down has not been detected), it is determined that an undesired surface characteristic is not present and the method proceeds to block 420 where an indication is provided to indicator 39 that the HDD has passed. By way of this alternative embodiment, the HDD can be tested in a more expeditious manner, as once the control signal to the TFC has reached the minimum value, it is not necessary to actually achieve touch-down as the control signal will only be increased to a higher value in subsequent steps.

Figure 5:
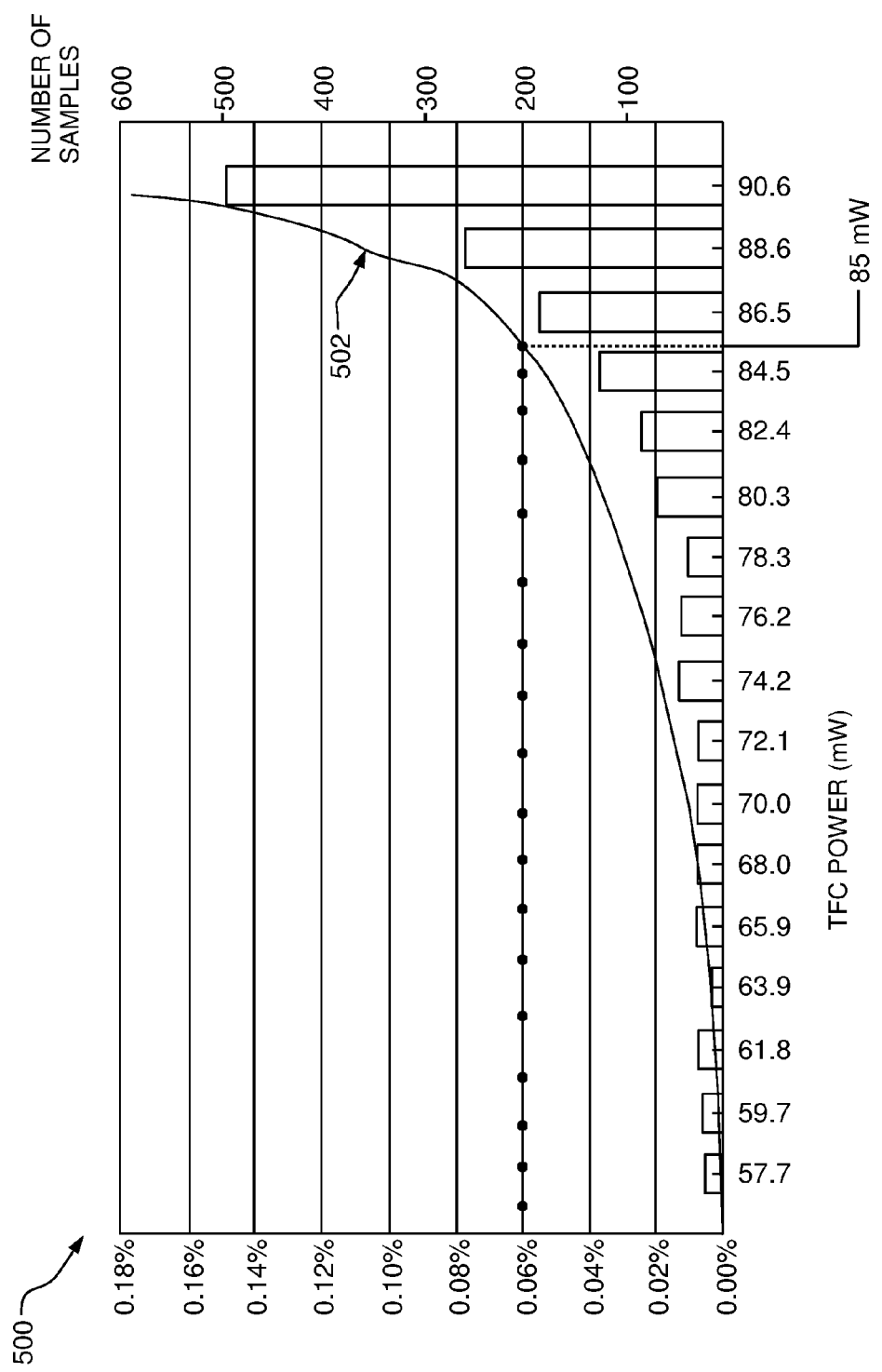
FIG. 5 is a graph showing the distribution of hard disk drives, based on the level of the control signal to the fly-height control, which results in a touch-down between the head slider and magnetic disk for each hard disk drive, according to one embodiment of the invention.

FIG. 5 is a bar graph showing the percentage (left hand scale) of HDDs of a control group that achieved touch-down for certain TFC power levels (bottom scale). With reference to FIG. 3, the TFC power level is the output of fly-height control circuit 34 (as controlled by controller 32) to the fly-height control 24. While the left hand scale indicates the percentage of the control group, the right hand scale indicates the total number of HDDs that achieved touch-down for certain TFC power levels. Curve 502 shows a cumulative total of HDDs (percentage or number of drives) that achieve touchdown at or below the corresponding TFC power level. As can be seen, for this exemplary control group, the percentage of HDDs that achieved touch-down at or below 85 mW is 0.06%. If 85 mW is used as the predetermined minimum value, the yield loss is only 0.06%, which is a relatively low number, yet can remove the most problematic head gimbal assemblies (HGAs) and improve HDD reliability and quality. It should be understood that the characteristics of HDDs and their corresponding HGAs and other components can vary. Therefore, while 85 mW may be an appropriate "cut-off" point for this group of drives, this value may be higher or lower for other groups. In one embodiment, a first range of appropriate cut-off values is between 60 mW and 95 mW and more specifically between 75 mW and 85 mW.

While the foregoing is directed to embodiments of the present invention, other and further embodiments of the invention may be devised without departing from the basic scope thereof, and the scope thereof is determined by the claims that follow.

What is claimed is:

1. A method of characterizing a hard disk drive, the hard disk drive comprising a magnetic disk and a head slider comprising read and write elements and a thermal fly-height control for adjusting a clearance between the head slider and the magnetic disk, the method comprising:
    applying a varying control signal to the fly-height control to adjust the clearance between the head slider and the magnetic disk; wherein the fly-height control is a heating element embedded in the head slider, and the control signal to the fly-height control comprises power supplied to the heating element;
    measuring an output of the read element as the control signal is varied;
    determining if a touch-down between the head slider and the magnetic disk has occurred based on the measured output of the read element; and
    characterizing the hard disk drive based on the varied control signal to the fly-height control, and on whether a touch-down has occurred; wherein characterizing the hard disk drive comprises determining that the power supplied to the heating element is above a predetermined value when it is determined that a touch-down between the head slider and the magnetic disk has not occurred.

2. The method of claim 1, wherein the step of determining if a touch-down between the head slider and the magnetic disk occurs comprises detecting a maximum value of the output of the read element.

3. The method of claim 1, wherein characterizing comprises determining if a predetermined surface characteristic exists in the hard disk drive, the predetermined surface characteristic comprising a head slider surface protrusion, scratch, surface contamination or any combination thereof.

4. The method of claim 1, wherein the step of characterizing the hard disk drive by comparing the varied control signal to the fly-height control to the predetermined value is done when it is determined that a touch-down between the head slider and the magnetic disk has not occurred.

5. The method of claim 1, wherein the predetermined value is between 60 mW and 95 mW.

6. An apparatus for characterizing a hard disk drive, the hard disk drive comprising a magnetic disk and a head slider comprising read and write elements and a thermal fly-height control for adjusting a clearance between the head slider and the magnetic disk, the apparatus comprising:
   a fly-height control circuit for applying a control signal to the fly-height control to adjust the clearance between the head slider and the magnetic disk; wherein the fly-height control is a heating element embedded in the head slider, and the fly-height control circuit applies power to the heating element;
   a read element sensing circuit for measuring an output of the read element;
   a touch-down detection circuit for providing a touch-down signal when a touch-down between the head slider and the magnetic disk occurs based on the measured output of the read element; and
   a controller circuit for receiving the touch-down signal from the touch-down detection circuit, and characterizing and providing an indication of the characterization of the hard disk drive based on the control signal applied to the fly-height control and on whether a touch-down has occurred, wherein the controller circuit characterizes the hard disk drive, based on the power supplied to the heating element being above a predetermined value.

7. The apparatus of claim 6, wherein the touch-down detection circuit provides the touch-down signal when a maximum value of the output of the read element is detected.

8. The apparatus of claim 6, wherein the characterizing is comprised by determining if a predetermined surface characteristic exists in the hard disk drive, the predetermined surface characteristic comprising a head slider surface protrusion, scratch, surface contamination or any combination thereof.

9. The apparatus of claim 6, wherein the predetermined value is between 60 mW and 95 mW.

10. A method of characterizing a hard disk drive, the hard disk drive comprising a magnetic disk and a head slider comprising read and write elements and a thermal fly-height control for adjusting a clearance between the head slider and the magnetic disk, the method comprising:
    applying a control signal to the fly-height control to adjust the clearance between the head slider and the recording disk;
    measuring an output of the read element;
    determining if a touch-down between the head slider and the recording disk occurs based on the measured output of the read element;
    measuring the control signal to the fly-height control upon determining a touch-down between the head slider and the magnetic disk; wherein the fly-height control is a heating element embedded in the head slider, and measuring the control signal to the fly-height control comprises measuring power supplied to the heating element; and
    characterizing the hard disk drive by comparing a predetermined value to the measured power at the time of the detected touch-down between the head slider and the magnetic disk.

11. The method of claim 10, wherein the step of determining if a touch-down between the head slider and the recording disk occurs comprises detecting a maximum value of the output of the read element.

12. The method of claim 10, wherein the characterizing comprises determining if a predetermined surface characteristic exists in the hard disk drive, the predetermined surface characteristic comprising a head slider surface protrusion, scratch, surface contamination or any combination thereof.

13. The method of claim 10, wherein the step of characterizing the hard disk drive comprises comparing the measured control signal to the fly-height control to the predetermined value, when it is determined that a touch-down between the head slider and the magnetic disk has not occurred.

14. The method of claim 10, wherein the predetermined value is between 60 mW and 95 mW.

15. A method of characterizing a hard disk drive, the hard disk drive comprising a magnetic disk and a head slider comprising read and write elements and a fly-height control for adjusting a clearance between the head slider and the magnetic disk, the method comprising:
    applying a varying control signal to the fly-height control to adjust the clearance between the head slider and the magnetic disk;
    measuring an output of the read element as the control signal is varied;
    determining if a touch-down between the head slider and the magnetic disk has occurred based on the measured output of the read element; and
    determining that the varied control signal is above a predetermined value; and
    characterizing the hard disk drive as passing or failing a performance test indicating manufacturing suitability based on the varied control signal being above the predetermined value when it is determined that a touch-down has not occurred.

16. The method of claim 15, wherein the step of determining if a touch-down between the head slider and the magnetic disk occurs comprises detecting a maximum value of the output of the read element.

17. The method of claim 15, wherein characterizing comprises determining if a predetermined surface characteristic exists in the hard disk drive, the predetermined surface characteristic comprising a head slider surface protrusion, scratch, surface contamination or any combination thereof.

* * * * *